United States Patent
Lou et al.

(10) Patent No.: US 10,935,730 B1
(45) Date of Patent: *Mar. 2, 2021

(54) WAVEGUIDE DISPLAY DEVICE

(71) Applicant: Shanghai North Ocean Photonics Co., Ltd., Shanghai (CN)

(72) Inventors: Xinye Lou, Shanghai (CN); He Huang, Shanghai (CN); Tao Lin, Shanghai (CN)

(73) Assignee: Shanghai North Ocean Photonics Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,880

(22) Filed: Mar. 27, 2020

Related U.S. Application Data

(63) Continuation-in-part of application No. 16/695,141, filed on Nov. 25, 2019.

(51) Int. Cl.
  *G02B 6/34* (2006.01)
  *G02B 27/01* (2006.01)

(52) U.S. Cl.
  CPC .......... *G02B 6/34* (2013.01); *G02B 27/0172* (2013.01); *G02B 2027/0178* (2013.01)

(58) Field of Classification Search
  CPC .............. G02B 6/34; G02B 27/0172; G02B 2027/0178
  See application file for complete search history.

(56) References Cited

U.S. PATENT DOCUMENTS

| | | | | |
|---|---|---|---|---|
| 8,320,032 B2 * | 11/2012 | Levola | ................ | G02B 6/0018 359/34 |
| 8,548,290 B2 * | 10/2013 | Travers | .............. | G02B 27/0081 385/37 |
| 8,885,997 B2 * | 11/2014 | Nguyen | ............... | G02B 6/0076 385/37 |
| 10,061,124 B2 * | 8/2018 | Tervo | .................. | G02B 5/1819 |
| 10,095,045 B2 * | 10/2018 | Robbins | ............ | G02B 27/0172 |
| 10,234,686 B2 * | 3/2019 | Vallius | ................. | G02B 5/1842 |
| 10,317,677 B2 * | 6/2019 | Levola | ............... | G02B 27/0172 |
| 10,578,876 B1 * | 3/2020 | Lam | .................. | G02B 27/0093 |
| 2003/0067685 A1 * | 4/2003 | Niv | .......................... | G02B 5/32 359/566 |
| 2005/0180687 A1 * | 8/2005 | Amitai | .................. | G02B 6/003 385/31 |
| 2009/0141324 A1 * | 6/2009 | Mukawa | ............ | G02B 27/0081 359/13 |

(Continued)

FOREIGN PATENT DOCUMENTS

CN 108873350 A * 11/2018

*Primary Examiner* — Daniel Petkovsek

(74) *Attorney, Agent, or Firm* — Raymond Y. Chan; David and Raymond Patent Firm

(57) ABSTRACT

An optical waveguide includes an input diffractive optical element arranged for being aligned with an optical projector for diffracting light beams therefrom, a waveguide substrate, and an output diffractive optical element. Light diffracted by the output diffractive optical element is projected out of the waveguide substrate towards users' eyes. The output diffractive optical element has an effective area arranged to maintain a constant output flux per unit area therein for providing an uniform brightness of the light when the light is being projected out of the waveguide substrate.

20 Claims, 13 Drawing Sheets

(56) References Cited

U.S. PATENT DOCUMENTS

| | | | |
|---|---|---|---|
| 2011/0019874 A1* | 1/2011 | Jarvenpaa | G06F 3/013 |
| | | | 382/103 |
| 2019/0187474 A1* | 6/2019 | Bhargava | G02B 27/0172 |
| 2020/0026074 A1* | 1/2020 | Waldern | G02B 27/0093 |
| 2020/0116997 A1* | 4/2020 | Lee | G02B 6/0035 |

* cited by examiner

| | |
|---|---|
| n | 1.7 |
| λ | 525nm |
| Λ | 370nm |
| w | 185nm |
| ff | 0.5 |
| α | 45° |

Fig. 14

| N | $h_N$ (nm) |
|---|---|
| 1 | 37 |
| 2 | 39 |
| 3 | 41 |
| 4 | 43 |
| 5 | 46 |
| 6 | 50 |
| 7 | 58 |
| 8 | 70 |
| 9 | 95 |
| 10 | 134 |
| 11 | 199 |
| 12 | 290 |

Fig. 15

| | |
|---|---|
| n | 1.7 |
| λ | 525nm |
| $Λ_1$ | 577.5nm |
| $Λ_2$ | 577.5nm |
| h | 525nm |
| θ | 30° |
| φ | 30° |

Fig. 16

| N | d (nm) | $ff_N$ |
|---|---|---|
| 1 | 127.05 | 0.220 |
| 2 | 129.36 | 0.224 |
| 3 | 132.83 | 0.230 |
| 4 | 136.29 | 0.236 |
| 5 | 139.76 | 0.242 |
| 6 | 144.38 | 0.250 |
| 7 | 149.00 | 0.258 |
| 8 | 155.93 | 0.270 |
| 9 | 165.17 | 0.286 |
| 10 | 175.56 | 0.304 |
| 11 | 192.89 | 0.334 |
| 12 | 232.16 | 0.402 |

Fig. 17

WAVEGUIDE DISPLAY DEVICE

CROSS REFERENCE OF RELATED APPLICATION

This is a Continuation-In-Part application that claims the benefit of priority under 35 U.S.C. § 120 to a non-provisional application Ser. No. 16/695,141, filed Nov. 25, 2019, which is incorporated herewith by reference in its entity.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an augmented reality display device (AR) or a head-up display device, and more particularly to a waveguide display device, which is able to increase the brightness uniformity of an output image and to improve the system efficiency.

Description of Related Arts

Augmented reality is a new technology to provide an interactive experience of a real environment where virtual objects reside in the real world in a real time manner. Accordingly, a computer-generated prompt message, virtual object, or virtual scene is superimposed on the real world to achieve an interactive experience for users. Augmented reality has a very wide range of applications in data visualization, flight navigation, medical training, remote control, entertainment and art, etc., to enhance virtual information in real environments.

There are two major types of augmented reality display devices—optical and video see-through devices. Optical see-through systems have become mainstream due to their advantages in display resolution, visual bias, latency, etc.

Conventional optical systems based on a Bird Bath architecture or free-form elements have been designed for optical see-through devices. However, since these systems consist of conventional optical components, their packaging size cannot be minimized, and thus they are hardly compact enough for near-eye display systems. Furthermore, due to the constraint of the Lagrangian invariant, the sizes of the exit pupils of these conventional optical display systems are too limited to accommodate the wide range of interpupillary distance for users. On the contrary, the waveguide display device can effectively solve the above two problems. After an image is coupled into a waveguide, it goes through total reflection within the planar waveguide element, effectively reducing the thickness of the display system. In addition, an exit pupil expansion is achieved by using one or multiple optical components on the waveguide to control image output sequence. In the waveguide display device based on exit pupil expansion, energy in the waveguide is gradually attenuated during the image sequencing output process, and the diffraction efficiency of the input-and-output optical components on the diffraction waveguide is typically low, and thus the efficiency of the system is low as well. Therefore, how to achieve brightness uniformity and improve system efficiency are major aspects for user experience as well as system performance of augmented reality displays or heads-up displays.

Accordingly, Chinese patent, CN104280885A entitled "large exit pupil holographic waveguide glass system" disclosed a method of converting light intensity within interference to phase, wherein it can only be used for holographic grating waveguides in which refractive index is modulated. Chinese patent, CN107690599A entitled "Optical Display System", and U.S. Pat. No. 9,329,325 entitled "Optical Waveguides" disclose a method of placing one or more layers of gradient film on a monolithic optical waveguide to vary diffraction efficiency. However, the gradient coating is a complex process, and the manufacturing cost is relatively high since the process can only be applied on individual waveguides.

SUMMARY OF THE PRESENT INVENTION

The invention is advantageous in that it provides a waveguide display device, which is able to increase the brightness uniformity of an output image, to improve system efficiency and to reduce manufacturing cost.

Another advantage of the invention is to a waveguide display device, wherein the grating structure is modulated to provide a uniform image being seen by users, even when there is certain or relative displacement of the AR spectacle is present with respect to users' eyes, the brightness of the image can still remain uniform and stable (brightness within the eyebox is uniform).

Additional advantages and features of the invention will become apparent from the description which follows, and may be realized by means of the instrumentalities and combinations particular point out in the appended claims.

According to the present invention, the foregoing and other objects and advantages are attained by a waveguide display device comprising a waveguide substrate, an input diffractive optical element and an output diffractive optical element.

The input diffractive optical element is arranged for coupling an image coming out of a light engine to the waveguide substrate.

The waveguide substrate is arranged for reflecting light from the input diffractive optical element by means of total internal reflection towards the output diffractive optical element.

The output diffractive optical element is designed for partially diffracting and partially transmitting light reflected by the waveguide substrate via total internal reflection, wherein at each interaction, a portion of light is diffracted out of the waveguide substrate, and the remaining portion keeps traveling within the waveguide substrate by means of total internal reflection until the exit pupil expansion is completed.

The input diffractive optical element is optimized to have high in-coupling efficiency for improving system efficiency and therefore reducing device's power consumption. The input diffractive optical element is selected from a blazed grating, an asymmetric surface relief grating, or other diffractive structures having high in-coupling efficiency.

The waveguide substrate can be a flat plate made of highly transparent optical material for visible spectrum, wherein the upper and lower surfaces thereof are substantially parallel. The input and output diffractive optical elements can be placed on top of the substrate surface, or can be embedded within the substrate.

The output diffractive optical element is comprised of a periodic structure with low out-coupling efficiency to ensure continuous output during the process of exit pupil expansion. The out-coupling efficiency is modulated within the area of output diffractive optical element, wherein the modulation can be regional or continuous. The modulation, regional or continuous, is optimized according to the exit pupil expansion path.

While improving the in-coupling efficiency of the input diffractive optical element, the output diffractive optical element is arranged to output as much of light in the waveguide substrate as possible, for maximizing the efficiency of the waveguide display system. In the meantime, in order to provide a uniform brightness within the area of the exit pupil of the waveguide display device, the output diffractive optical element is arranged to maintain a constant output flux per unit area. According to the characteristics of exit pupil expansion, the out-coupling efficiency of the output diffractive optical element is optimized to:

$$\eta_N = \frac{1}{N_T - (N-1)} \quad (1)$$

wherein N is the n-th modulation region, $N_T$ is the total number of modulation regions, and $\eta_N$ is the out-coupling efficiency of the n-th region.

Due to the limitations of manufacturing accuracy, the out-coupling efficiency of the output diffractive optical element after optimization cannot be equal to the result given by equation (1), and only a portion of light inside of the waveguide substrate can be out-coupled. Assuming that the ratio of this portion to the total light energy is $\eta_T$, in order to provide uniform brightness within exit pupil, the out-coupling efficiency of the output diffractive optical element is optimized to:

$$\eta_N = \frac{\eta_T}{N_T - (N-1)} \quad (2)$$

The output diffractive optical element can be selected as a one-dimensional diffraction grating, wherein the diffraction efficiency is modulated by spatially varying grating structure. In other words, by designing grating structure to be spatial variant and optimizing its distribution, the one-dimensional diffraction grating structure can be designed to ensure that the out-coupling efficiency of the output diffractive optical element follows equation (1) or (2). For example, duty cycle and tooth height of a one-dimensional straight tooth surface relief grating can be modulated; the duty cycle, tooth height and tilt angle of a one-dimensional slanted tooth surface relief grating can modulated; the tooth height and surface angle of a one-dimensional blazed grating can be modulated.

The output diffractive optical element can be selected as a one-dimensional diffraction grating, wherein the diffraction efficiency is modulated by spatially varying grating structure. In other words, by designing grating structure to be spatial variant and optimizing its distribution, the one-dimensional diffraction grating structure can be designed to ensure that the out-coupling efficiency of the output diffractive optical element follows equation (1) or (2). For example, duty cycle and tooth height of a one-dimensional straight tooth surface relief grating can be modulated; the duty cycle, tooth height and tilt angle of a one-dimensional slanted tooth surface relief grating can modulated; and the tooth height and surface angle of a one-dimensional blazed grating can be modulated.

The output diffractive optical element can be selected as a two-dimensional periodic diffractive structure, wherein the diffraction efficiency is modulated by spatially varying grating structure. In other words, by designing grating structure to be spatial variant and optimizing its distribution, the two-dimensional periodic diffraction grating structure can be optimized to maximize out-coupling efficiency while maintain brightness uniformity. For example, the duty cycle and tooth height of a two-dimensional columnar diffractive structure can be modulated.

The etching process of the present invention can be one of the following: electron beam etching, reactive ion beam etching, magnetically enhanced reactive ion etching, high density plasma etching, inductively coupled plasma etching, pressure swing coupled plasma etching, and electrons cyclotron resonance etching. The tooth height modulation can be achieved by controlling time and exposure level of the electron beam or ion beam on the master substrate. For mass production, the grating structure on the master can be replicated onto replica resin material by nano imprinting, casting, molding, injection molding, and the like in order to reduce manufacturing cost.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 14 is a table showing the relevant parameters of the system and the grating.

FIG. 15 is a table showing the tooth profile depth of the grating in each modulation region.

FIG. 16 is a table showing the relevant parameters of the system, the diffraction structure, and the angle of incidence.

FIG. 17 is a table showing the duty cycle of the columnar structure in each modulation region.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
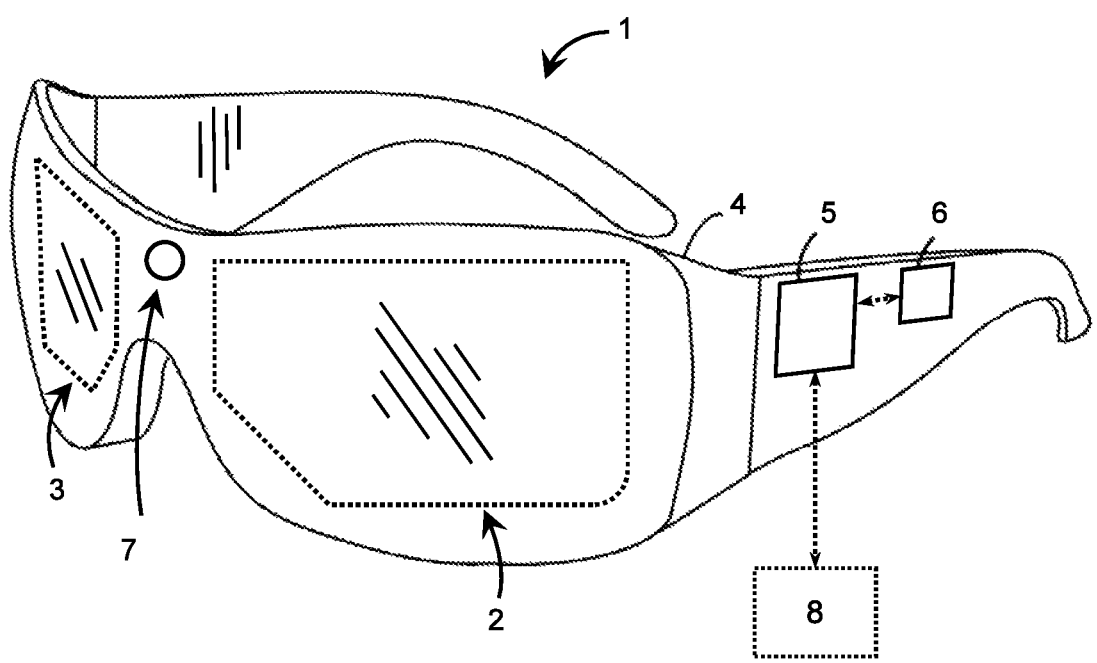
FIG. 1 is a perspective view of a spectacle frame of an optical see-through augmented reality waveguide display device according to a preferred embodiment of the present invention.

Referring to FIG. 1 of the drawings, an augmented reality device for being worn by a user is illustrated, wherein the augmented reality wearable device comprises a spectacle frame 4 and a waveguide display device. The spectacle frame 4 comprises two spectacle arms and a bridge, and an augmented reality system 1. The augmented reality system 1 comprises a waveguide display device which comprises two optical waveguides, i.e. a left-eye optical waveguide 2 and a right-eye optical waveguide 3, wherein the bridge is extended between two inner sides of the optical waveguides and the spectacle arms are extended from two outer sides of the optical waveguides respectively. The augmented reality system 1 further comprises a computing module 5, inertial sensors 6, an environment sensor 7, and a remote computing system 8. The left-eye optical waveguide 2 and the right-eye optical waveguide 3 have high optical transmittance for users to clearly see through. The computing module 5 is provided at, preferably built-in with, a spectacle arm for generating corresponding image signals for left and right eyes to provide a three-dimensional stereoscopic experience. The computing module 5 is further operatively connected with various sensors, such as inertial sensors 6 and GPS transceiver. In one embodiment, inertial sensors 6 include a three-axis magnetometer, three axis gyro and three axis accelerometer. The inertial sensors are for sensing position, orientation, and sudden accelerations of augmented reality device. From these movements, head position may also be determined. Given the output of the inertial sensors 6, virtual objects can be accurately superimposed onto the real world. The environment sensor 7 is built-in at the bridge and can be a combination of RGB camera(s), monochromatic camera(s), and depth-sensing camera(s). RGB camera(s) or monochrome camera(s) is/are arranged to acquire the real scene, wherein depth-sensing camera is arranged to acquire depth information of the external environment. When the depth-sensing camera and other cameras are calibrated and all cameras are synchronized in time, a complete map of the actual scene can be obtained. The remote computing system 8 is arranged to provide additional computing power to the computing module 5 at the spectacle frame 4 through wire or wireless connection. Alternatively, the remote computing system 8 can be the only computing resource in the augmented reality system 1.

Figure 2:
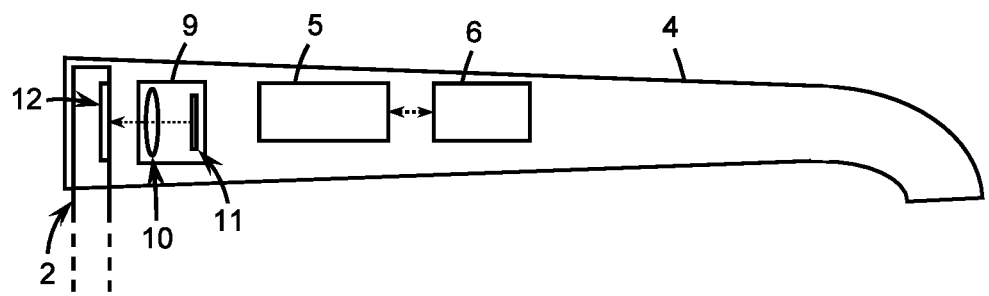
FIG. 2 is a side view of the spectacle frame of an optical see-through augmented reality waveguide display device according to the above preferred embodiment of the present invention.

As shown in FIG. 2, mounted to or inside the arms of the spectacle frame 4 is an optical projector 9. The optical projector 9 comprises a micro-display 11 for projecting virtual images and the lens system 10 for directing images from micro-display 11 into a waveguide. There are multiple image generation technologies that can be used to implement micro-display 11. For example, the micro-display 11 can be a liquid crystal display (LCD) using a transmissive projection technology where the light source is modulated by optically active material, backlit with white light. Alternatively, the image can be formed by reflective modulation method, such as digital light processors (DLPs) and liquid crystal on silicon (LCoS). Micro-display 11 can also be implemented using a self-emissive technology, for instance, organic light emitting diode (OLED) or micro light emitting diode (Micro LED). The micro-display 11 can also incorporate with a MEMS Scanning Mirror. The lens group 10 is constructed with one or more optical elements.

Figure 3:
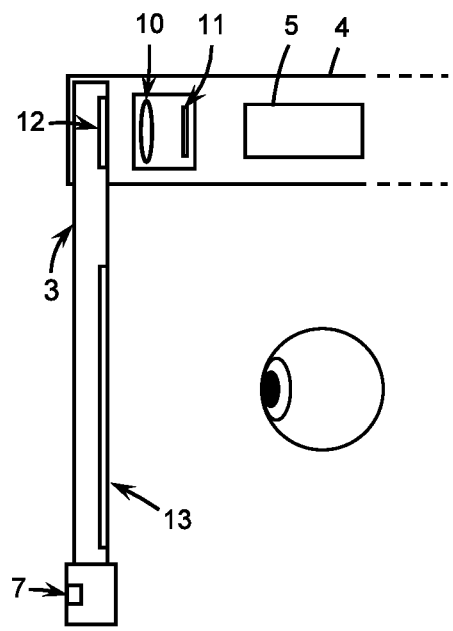
FIG. 3 is a sectional view of an optical see-through augmented reality waveguide display device according to the above preferred embodiment of the present invention.

As shown in FIG. 3, the right-eye optical waveguide 3 is attached to the right side of the spectacle frame 4, wherein the right-eye optical waveguide 3 comprises an input diffractive optical element 12 and an output diffractive optical element 13. Accordingly, after the light diffracted by the input diffractive optical element 12, it experiences total internal reflection within the right-eye optical waveguide 3 and travels towards the output diffractive optical element 13.

Figure 4:
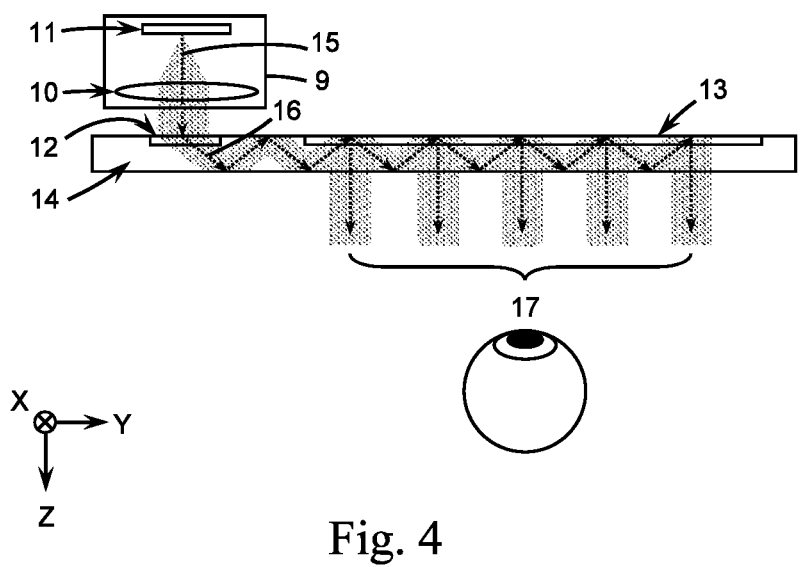
FIG. 4 is a top view of an optical see-through augmented reality waveguide display device according to the above preferred embodiment of the present invention.

As shown in FIG. 4, the light cone 15 generated by a pixel on the micro-display 11 is collimated by the lens system 10 in the optical projector 9. After being diffracted by the input diffractive optical element 12, the first diffraction order 16 satisfies the total internal reflection condition of the waveguide, and therefore it gets fully reflected at the two air-glass interfaces of the waveguide substrate 14 of the right-eye optical waveguide 3 and travels towards the output diffractive optical element 13. At each time the first diffraction order 16 interacts with the output diffractive optical element 13, the first diffraction order 16 is partially transmitted while partially diffracted. The diffracted portion 17 is projected out of the waveguide substrate 14 towards user's eye. The transmitted portion further travels within the waveguide substrate 14 through total internal reflection until being projected out of the waveguide substrate 14 towards user's eye, so as to complete the exit pupil expansion along Y-direction.

It is worth mentioning that the waveguide substrate 14 has a diffractive side and an opposed projecting side, wherein the input diffractive optical element 12 and the output diffractive optical element 13 are located at the diffractive side of the waveguide substrate 14 for guiding the diffracted lights 17 being projected out the waveguide substrate 14 through the projecting side thereof.

Figure 5:
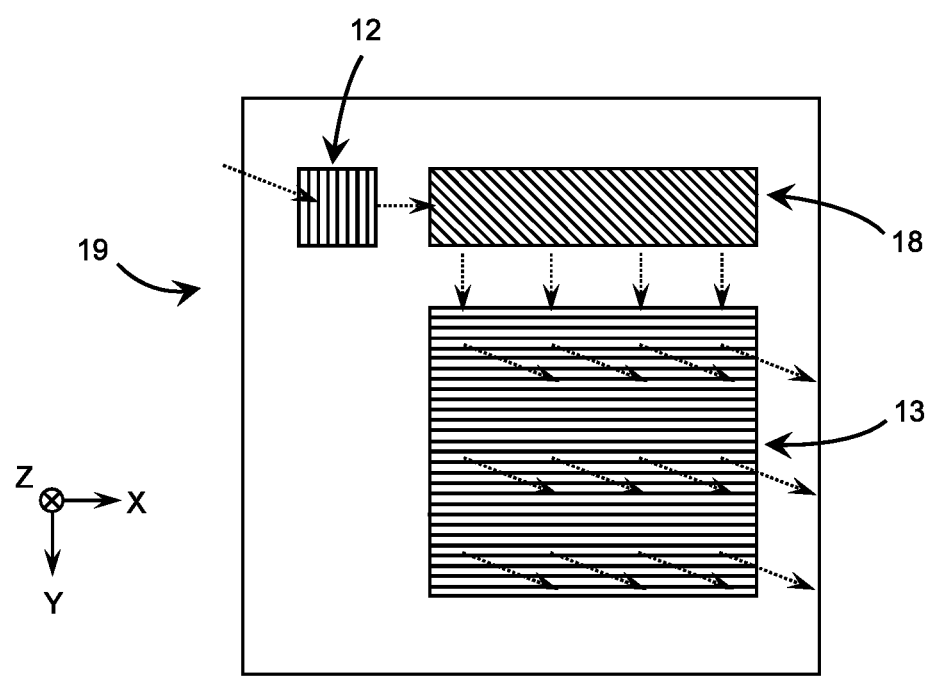
FIG. 5 illustrates an optical waveguide with two-dimensional exit pupil expansion by using one-dimensional linear gratings according to the above preferred embodiment of the present invention.

Accordingly, the present invention can be applied to different configurations of the diffraction waveguide augmented reality devices. The augmented reality device based on a one-dimensional linear diffraction waveguide will be described in the following as an example. FIG. 5 illustrates a one-dimensional linear diffraction waveguide, which comprises an input diffractive optical element 12, an output diffractive optical element 13, and a transmission diffractive optical element 18. This configuration is able to perform a two-dimensional pupil expansion. The virtual image from the optical projector (not shown) centers along the orthogonal direction of the one-dimensional linear diffraction waveguide 19. The input diffractive optical element 12 is arranged to diffract the input light, wherein the first diffraction order satisfies the total internal reflection condition of the waveguide substrate, such that the light is guided towards the transmission diffractive optical element 18. The total internal reflected light in the one-dimensional linear diffraction waveguide 19 will be transmitted or diffracted each time when the light interacts with the transmission diffractive optical element 18. The first diffraction order generated by the transmission diffractive optical element 18 meets the total internal reflection condition of the waveguide substrate, and propagates towards the output diffractive optical element 13 in the substrate. The light directly transmitted through the transmission diffractive optical element 18 will be continuously reflected via the total internal reflection until the light is diffracted out of the output diffractive optical element 13 so as to complete the one-dimensional exit pupil expansion along X-direction. Furthermore, the light from the transmission region is also partially diffracted and partially transmitted each time when it interacts with the output diffractive optical element 13. The diffracted light is projected out of the one-dimensional linear diffraction waveguide 19 towards user's eye. The transmitted light is guided to be continuously reflected via the total internal reflection in the one-dimensional linear diffraction waveguide 19 until the light is diffracted out of the output diffractive optical element 13 so as to complete the one-dimensional exit pupil expansion along Y-direction. The light is successively expanded in the X and Y direction, such that the waveguide display device, as shown in FIG. 5, can perform the two-dimensional exit pupil expansion by diffracting the light through the diffractive optical element 18 and outputting the light from the output diffractive optical element 13. The waveguide display device can be configured as shown in FIG. 5, to include only the input diffractive optical element and the output diffractive optical element, but not the transmission diffractive optical element. In one example, after the light is diffracted by the input diffractive optical element, it directly travels towards the output diffractive optical element through total internal reflection. The light is then guided to be gradually diffracted by the output diffractive optical element so as to complete a one-dimensional expansion.

Figure 6A:
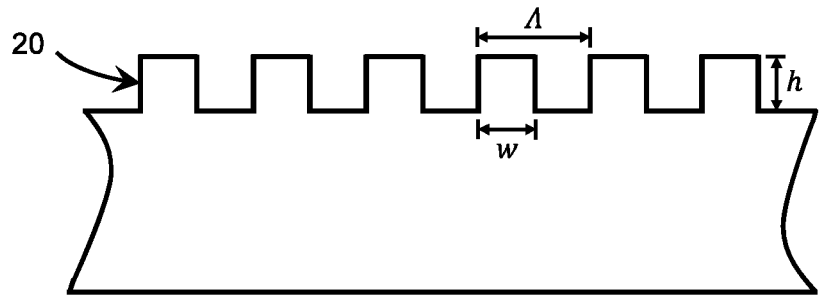
FIG. 6A illustrates a one-dimensional straight tooth surface relief grating according to the above preferred embodiment of the present invention.
Figure 6B:
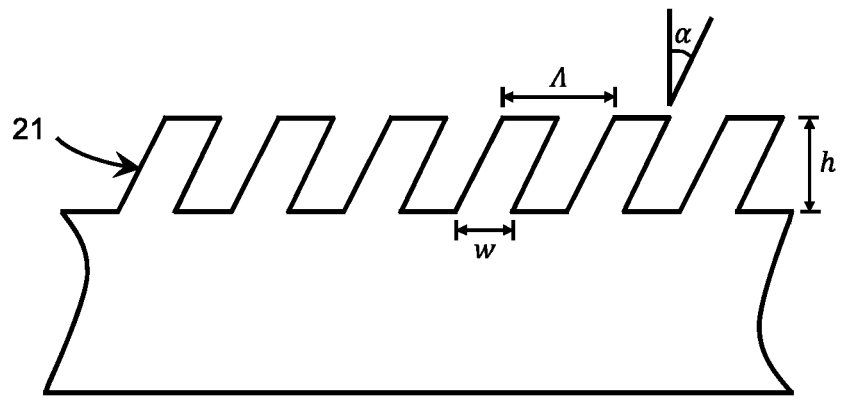
FIG. 6B illustrates a one-dimensional slanted tooth surface relief grating according to the above preferred embodiment of the present invention.
Figure 6C:
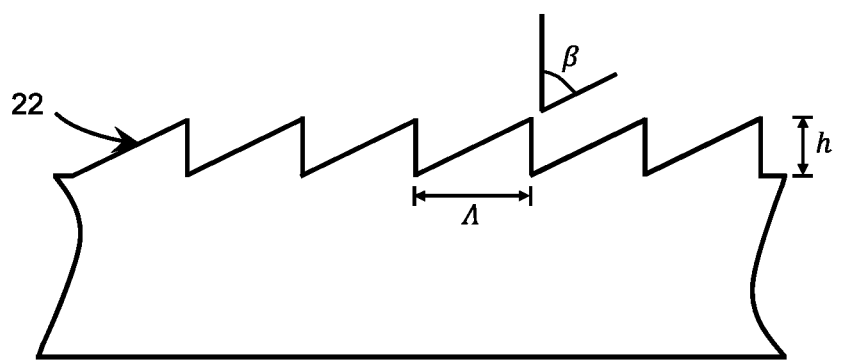
FIG. 6C illustrates a one-dimensional blazed grating according to the above preferred embodiment of the present invention.

FIGS. 6A to 6C illustrate three various configurations of one-dimensional linear diffraction gratings. The input diffractive optical element 12, the output diffractive optical element 13 and the transmission diffractive optical element 18 can all be selectively constructed in the above configurations. FIG. 6A illustrates a one-dimensional straight tooth surface relief grating 20 which comprises a tooth unit perpendicularly extended to the waveguide substrate, wherein its associated tooth profile parameters can be a grating period $\Lambda$, a tooth width w and a tooth height h. FIG. 6B illustrates a one-dimensional slanted tooth surface relief grating 21, wherein the tooth unit is slantedly extended to the waveguide substrate with an angle $\alpha$, and its associated tooth profile parameters can be a grating period $\Lambda$, a tooth width w and a tooth height h. FIG. 6C illustrates a one-dimensional blazed grating 22, wherein an angle between the blazed surface and the non-blazed surface is $\beta$, the grating period is $\Lambda$, and the tooth height is h. As shown, the grating structures shown in FIG. 6A-6C have a constant tooth profile. In other words, the parameters associated with the tooth profile do not change with respect to the position of the grating on the waveguide face, i.e., the grating structure is non-modulated. The diffraction efficiency of the grating is determined by parameters of its tooth shape, wherein the non-modulated grating structure has a constant diffraction efficiency for the incident light coming from the same direction. Therefore, since the output diffractive optical element is needed to gradually output the light energy within its effective region, a constant diffraction efficiency will cause the luminous flux to drop at each interaction step. Therefore, it is impossible to obtain an uniform brightness for the output image within the exit pupil of the waveguide.

In order to solve the above problem, the present invention provides a modulated grating structure. In other words, via changing the tooth shape with respect to the position of the grating on the waveguide surface, the out-coupling diffraction efficiency of the output diffractive optical element at various positions will be different. According to the characteristics of the exit pupil expansion, when the out-coupling diffraction efficiency of the output diffractive optical element is optimized to be equal to the result given by the equation (1), the output luminous flux per unit area in the effective area is kept constant, such that the brightness of the image projected to user is uniform and the efficiency of the waveguide display device is maximized. In other words, the image brightness is maximized under an assumption that the system power consumption is set at a fixed level or the system power consumption is minimized under an assumption that the image brightness is set a fixed level.

$$\eta_N = \frac{1}{N_T - (N-1)} \quad (1)$$

wherein N is the n-th modulation region, $N_T$ is the total number of modulation regions, and $\eta_N$ is the out-coupling efficiency of the n-th region.

It is worth mentioning that the equation (1) is used for providing an uniform image visible to the user, and ensuring the output light flux per unit area in the output diffraction grating region to be constant.

Due to limited manufacturing accuracy for the diffractive optical elements, when the out-coupling efficiency of the output diffractive optical element cannot be equal to the result given by the equation (1), only a portion of light inside of the waveguide substrate can be out-coupled. Assuming that the ratio of this portion to the total light energy is $\eta_\tau$, in order to provide uniform brightness within exit pupil, the out-coupling efficiency of the output diffractive optical element is optimized to the equation (2).

$$\eta_N = \frac{\eta_T}{N_T - (N-1)} \quad (2)$$

In order to optimize the out-coupling efficiency, structural parameters having obvious effects on the diffraction efficiency should be selected. For instance, the diffraction efficiency of the straight tooth surface relief grating 20 can be modulated by changing the duty ratio ff=w/Λ or the tooth height h. The slanted tooth surface relief grating 21 can modulate the duty ratio, the tooth height or the tilt angle α. The blazed grating 22 can modulate the tooth height or the face angle β.

Figure 7A:
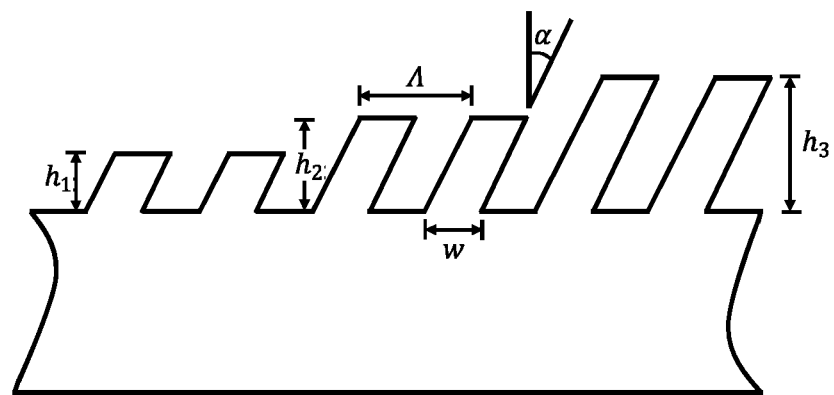
FIG. 7A illustrates a depth modulated one-dimensional straight tooth surface relief grating with modulation being aligned to the bottom of the grating tooth according to the above preferred embodiment of the present invention.
Figure 7B:
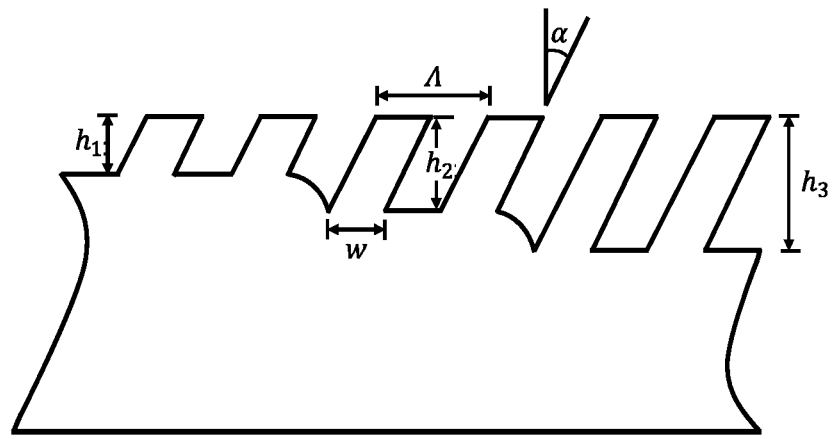
FIG. 7B illustrates a depth modulated one-dimensional straight tooth surface relief grating with modulation being aligned to the top of the grating tooth according to the above preferred embodiment of the present invention.

Taking the tooth height of the surface relief grating as an example, the tooth height is arranged to be changed according to the position of the grating on the waveguide surface. Depending on the manufacturing method, the modulated structure can be aligned to the bottom of the grating tooth as shown in FIG. 7A or to the top of the grating tooth as shown in FIG. 7B. The etching process of the present invention can be one of the following: electron beam etching, reactive ion beam etching, magnetically enhanced reactive ion etching, high density plasma etching, inductively coupled plasma etching, pressure swing coupled plasma etching, and electrons cyclotron resonance etching. The modulation tooth height can be achieved by controlling the etching time and/or exposure level of the electron beam or ion beam on the master substrate. For mass production, the grating structure on the master substrate can be replicated onto the replica resin material by nano imprinting, casting, molding, injection molding, etc.

Figure 8A:
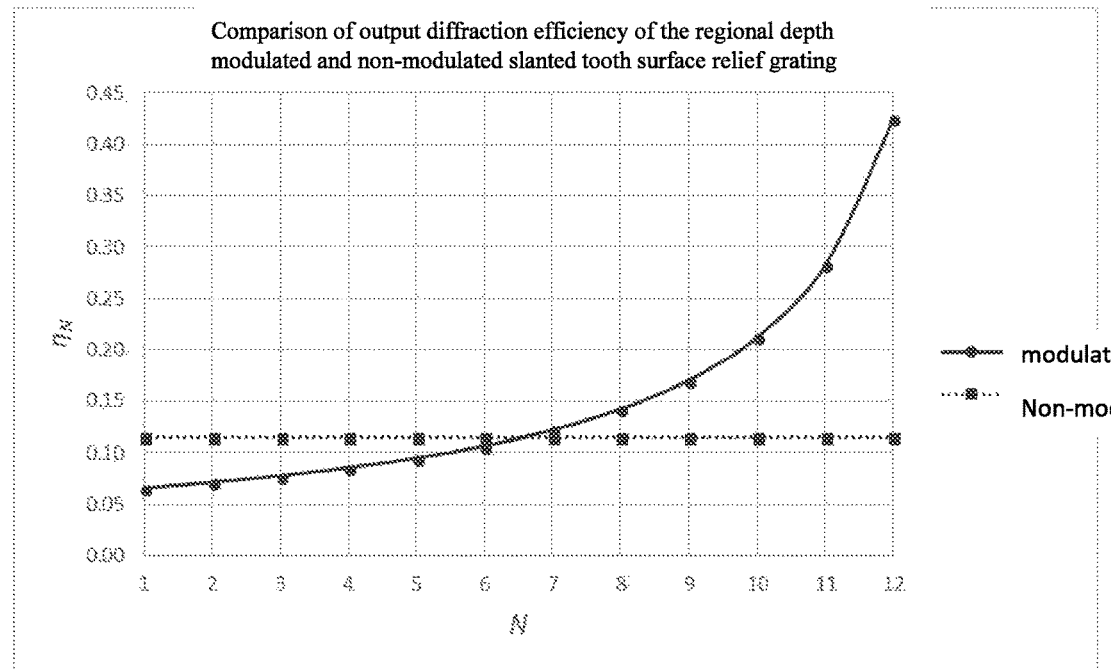
FIG. 8A is a table illustrating a comparison of an output diffraction efficiency of the regional depth modulated slanted tooth surface relief grating and that of the non-modulated slanted tooth surface relief grating.
Figure 8B:
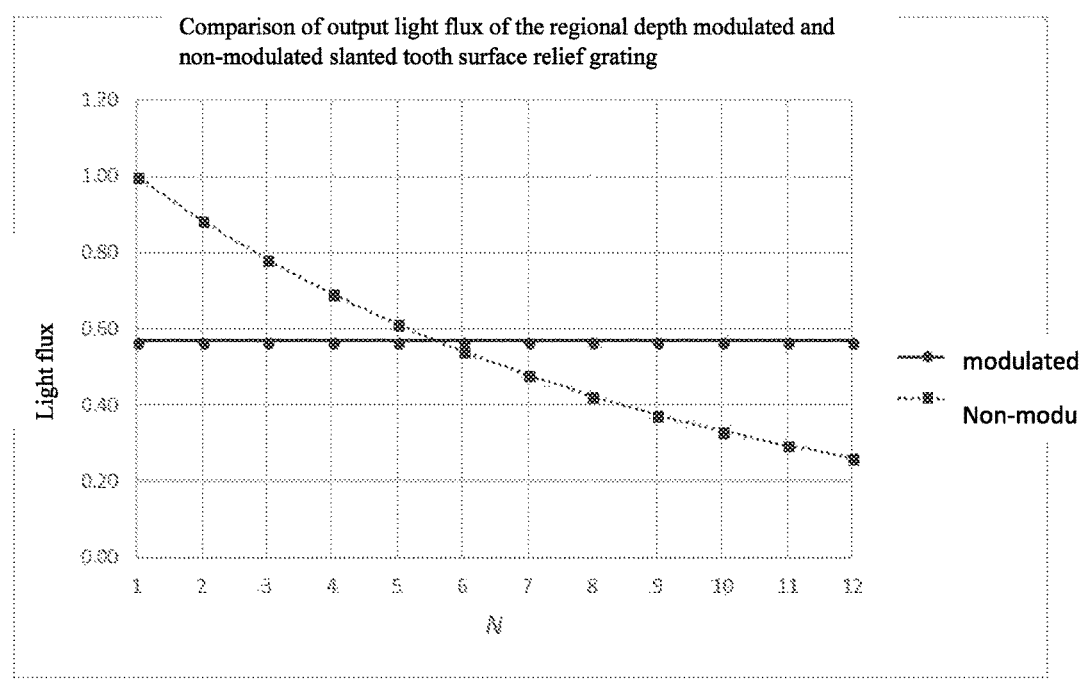
FIG. 8B is a table illustrating a comparison of an output flux of the regional depth modulated slanted tooth surface relief grating and that of the non-modulated slanted tooth surface relief grating.

In one example, assume that the waveguide substrate has a refractive index of n=1.7, and the modulated slanted tooth surface relief grating has 12 depth modulation regions. FIG. 14 lists the relevant parameters for both the grating and the system. FIG. 15 lists the depth of the grating tooth in each modulation region. As shown in FIG. 8A, the diffraction efficiency of the slanted tooth surface relief grating increases significantly as the grating depth increases. As shown in FIG. 8B, the output light flux of each area for the modulated case is constant, such that the user is able to see an image with uniform brightness. In both FIG. 8A and FIG. 8B, the non-modulated case is assumed to have the same total output light flux as that of the modulated one. The non-modulated slanted tooth surface relief grating has a constant output diffraction efficiency, and therefore the output light flux rapidly decreases along the propagation path within the exit pupil. As a result, the brightness of the output image is non-uniform within the exit pupil.

The manufacturing method of the optical waveguide comprises the following steps.

(1) Form the master substrate by means of electron beam lithography or other applicable lithography techniques.

(2) Etch the master substrate by using reactive ion beam etching or other applicable etching processes.

(3) Nano-imprint the master substrate for mass production through the following steps.

(a) Place a chemical precursor of an elastic sub-mold in the master substrate, and after polymerization, remove the chemical precursor from the master substrate to form the elastic sub-mold, wherein the elastic sub-mold has a mold cavity formed with respect to the master substrate.

(b) Evenly apply a layer of resin on a wafer substrate, wherein the resin can be UV solidifying resin or thermosetting resin.

(c) Mold the elastic sub-mold into the wafer substrate, preferably by applying pressure, in order to fully fill the mold cavity of the elastic sub-mold with resin. Perform polymerization and solidification of the resin by ultraviolet light or heat.

(d) Remove the elastic sub-mold from the wafer substrate. The replicated structure is formed on the wafer substrate.

Figure 9A:
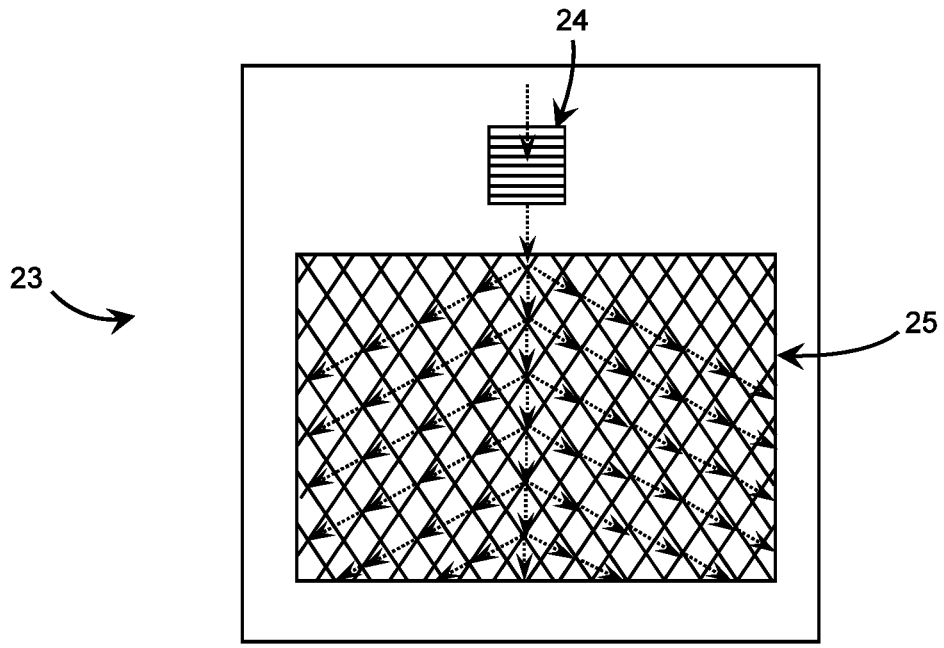
FIG. 9A is a front view of an optical waveguide with two dimensional exit pupil expansion by using of two-dimensional linear diffraction gratings according to the above preferred embodiment of the present invention.
Figure 9B:
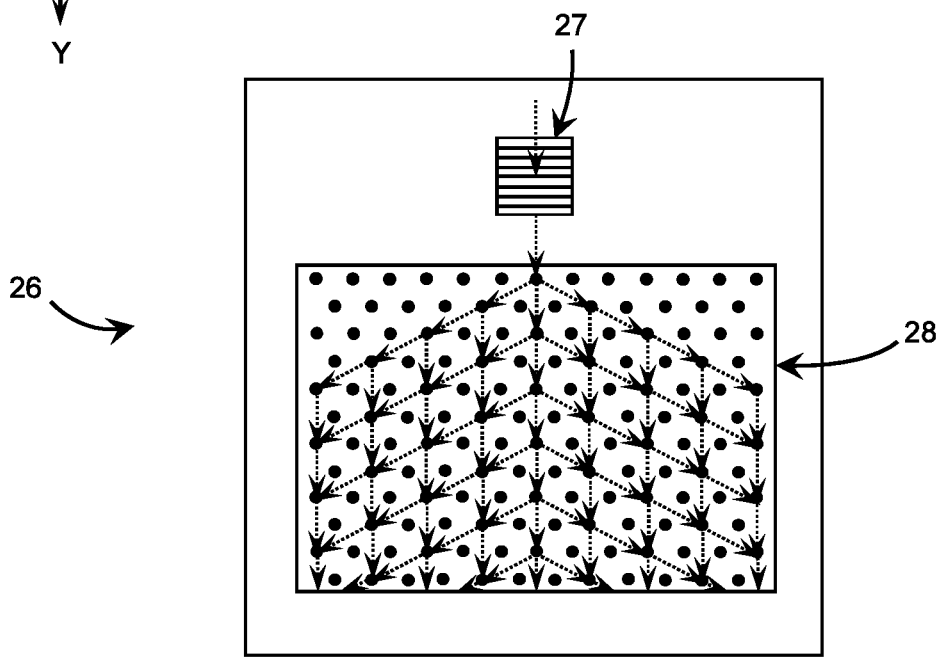
FIG. 9B is a front view of an optical waveguide with two dimensional exit pupil expansion by using of two-dimensional cylindrical diffraction gratings according to the above preferred embodiment of the present invention.
Figure 10A:
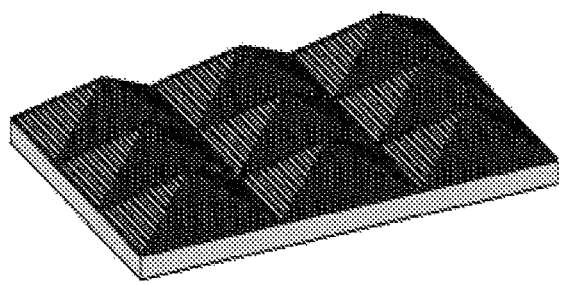
FIG. 10A is a schematic view of a two-dimensional pyramid diffraction structure according to the above preferred embodiment of the present invention.
Figure 10B:
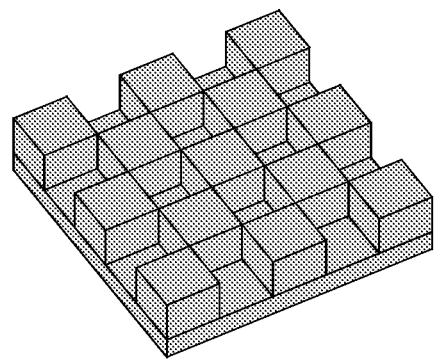
FIG. 10B is a schematic view of a two-dimensional checkerboard diffraction structure according to the above preferred embodiment of the present invention.
Figure 10C:
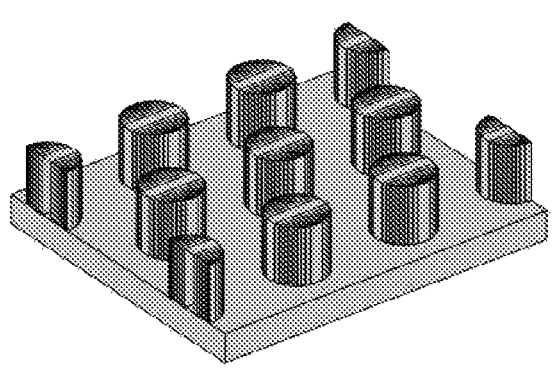
FIG. 10C is a schematic view of a two-dimensional columnar diffraction structure according to the above preferred embodiment of the present invention.
Figure 10D:
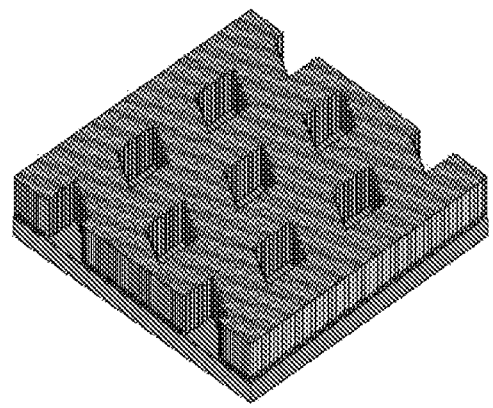
FIG. 10D is a schematic view of a two-dimensional skewed diffraction structure according to the above preferred embodiment of the present invention.
Figure 10E:
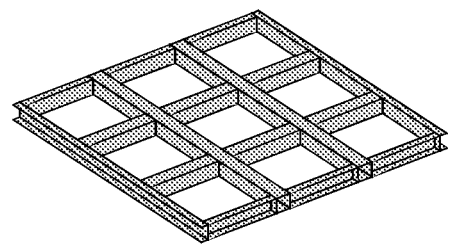
FIG. 10E is a schematic view of a two-dimensional orthogonal diffraction structure according to the above preferred embodiment of the present invention.

The present invention can also be applied to the optical waveguide based on a two-dimensional periodic diffraction structure. The working principle for this type of waveguides can be demonstrated by the following two examples: waveguides based on two-dimensional linear diffraction grating and two-dimensional columnar structure diffraction grating. FIGS. 9A and 9B illustrate the optical path of the waveguides based on two-dimensional linear diffraction grating 23 and two-dimensional columnar structure diffraction grating 26, respectively. The input region 24 of the two-dimensional linear diffraction waveguide 23 and the input region 27 of the two-dimensional columnar diffraction waveguide 26 can be configured as an one-dimensional linear diffraction structure or a two-dimensional periodic diffraction structure. The output region 25 of the two-dimensional linear diffraction waveguide 23 and the output region 28 of the two-dimensional columnar structure diffraction waveguide 26 can be configured as a two-dimensional periodic diffraction structure. The periodicity of the two-dimensional periodic diffractive structure has at least two directions, wherein the directions of the periodicity can be perpendicular to each other or can be formed with a specific angle in between. Being different from the one-dimensional diffraction waveguide in which both the transmission diffractive optical element and the output diffractive optical element are required to complete the two-dimensional exit pupil expansion, the two-dimensional periodic diffractive structure allows the light in the waveguide substrate to complete the two-dimensional exit pupil expansion within the single output region, i.e., the region 25 of the two-dimensional linear diffraction waveguide 23 or the region 28 of the two-dimensional columnar diffraction waveguide 26.

FIGS. 10A to 10E illustrate five various two-dimensional periodic diffraction structures which include pyramid, checkerboard, columnar, linear oblique intersection, and linear orthogonal, but it should be noted that two-dimensional periodic structures that are applicable to the present invention are not limited to these types. Similar to the above one-dimensional linear diffraction grating, if the dimensional parameters of the two-dimensional periodic diffraction structure remain unchanged, i.e. the structure is non-modulated, its out-coupling diffraction efficiency remains constant, and then during the successive output process within the two-dimensional diffraction out-coupling region, the light flux out-coupled at each interaction decreases. Therefore, the brightness of virtual image seen by user is not uniform within the extent of the exit pupil. The present invention can be applied to the optical waveguide based on the two-dimensional periodic diffraction structure through modulating the relevant structural parameters to spatially tune the out-coupling diffraction efficiency to achieve brightness uniformity for the output image.

Figure 11A:
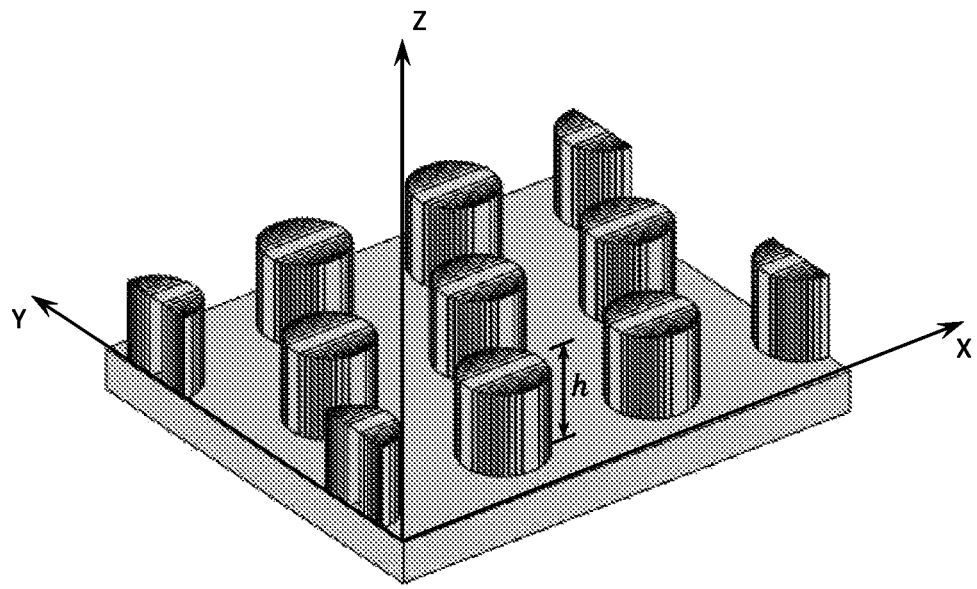
FIG. 11A is a perspective view illustrating a two-dimensional columnar diffraction structure with a Cartesian coordinate system, wherein the X-axis of the coordinate system is parallel to the direction of a specific periodicity.
Figure 11B:
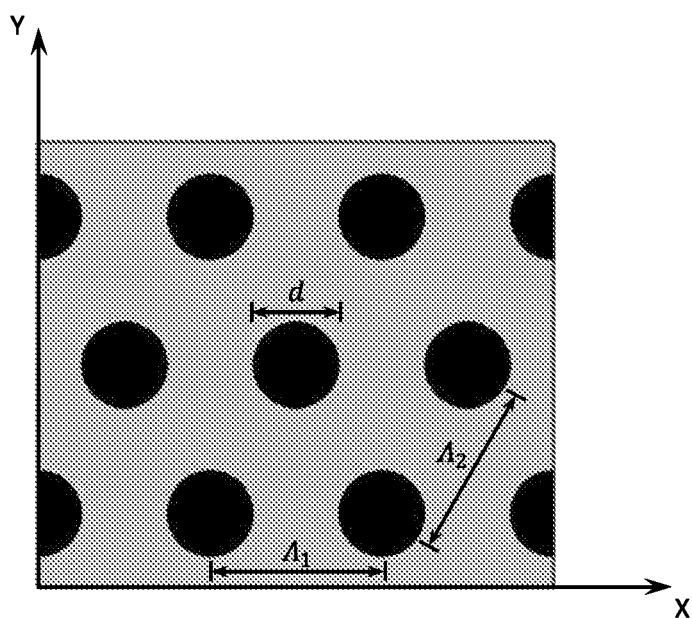
FIG. 11B is a top view illustrating a two-dimensional columnar diffraction structure according to the above preferred embodiment of the present invention.
Figure 12:
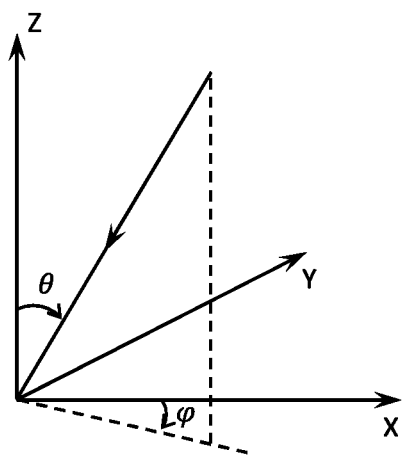
FIG. 12 is a polar coordinate system defining light incident direction according to the above preferred embodiment of the present invention.
Figure 13A:
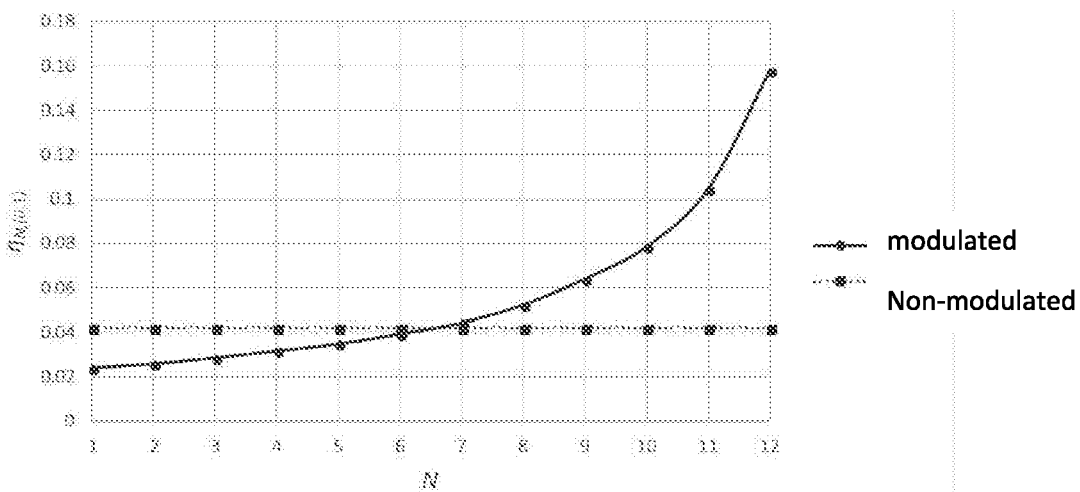
FIG. 13A is a table illustrating a comparison of (1,1) order transmission diffraction efficiency for the two-dimensional columnar diffraction structure with modulated and non-modulated duty cycle.
Figure 13B:
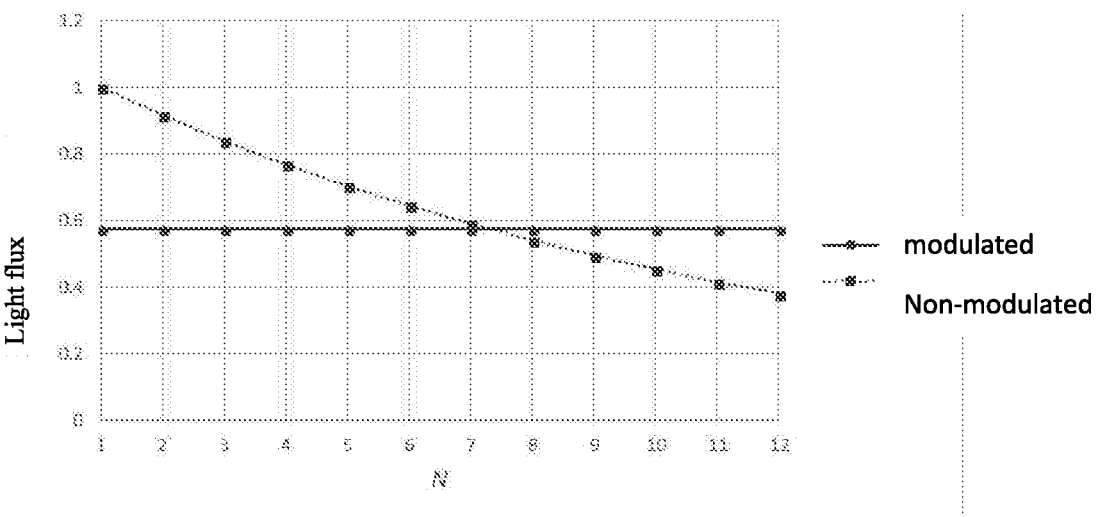
FIG. 13B is a table illustrating a comparison of (1,1) order output flux for the two-dimensional columnar diffraction structure with modulated and non-modulated duty cycle.

Use two-dimensional columnar diffraction structure as an example. FIGS. 11A and 11B show the layout and its related parameters. The X-axis of the coordinate system is parallel to the direction of the first periodicity, and the Z-axis is perpendicular to the waveguide surface. The relevant structural parameters are height h, column diameter d, first period $\Lambda_1$ and second period $\Lambda 2$. FIG. 12 illustrates that the direction of the incident light is defined by a polar angle $\theta$ and an azimuth angle $\varphi$ in the polar coordinate system. Due to its periodicity in multiple directions, the diffraction order of the two-dimensional structure is expressed in the form of (m, n). The diffraction efficiency of the two-dimensional columnar diffractive structure can be modulated by varying the duty ratio $ff_1 = d/\Lambda_1$ and $ff_2 = d/\Lambda_2$ or the tooth height h. The following is an example of a columnar diffraction structure that has 12 modulated regions for duty ratio and a refractive index n=1.7. FIG. 16 shows the relevant parameters. FIG. 17 shows the duty cycle of the columnar structure in each modulation region. Such design utilizes (1,1) as the out-coupling order. FIG. 13A shows a comparison of diffraction efficiency between the modulated and non-modulated case, wherein the diffraction efficiency of the modulated two-dimensional columnar diffraction structure significantly increases with the duty ratio. This result indicates the sensitivity of the diffraction efficiency to the duty cycle for a two-dimensional columnar diffraction structure. As shown in FIG. 13B, under the condition of the total light flux being equal, the out-coupling light flux of the non-modulated two-dimensional columnar diffraction structure gradually decreases during propagation, and therefore the brightness of the output image is non-uniform within the exit pupil. On the contrary, the modulated case has a constant out-coupling light flux in each modulation region, resulting in an uniform image to be seen by the user.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An augmented reality device for being worn by a user, comprising:

a spectacle frame which comprises two spectacle arms and a bridge; and
an augmented reality system which comprises:
an optical projector provided at each of said spectacle arms for light projecting; and
a waveguide display device which comprises:
two optical waveguides provided at said spectacle frame for aligning with eyes of the user respectively, wherein each of said optical waveguides comprises:
an input diffractive optical element aligned with said optical projector for diffracting a light therefrom;
a waveguide substrate arranged for propagating the light diffracted by said input diffractive optical element by means of total internal reflection; and
an output diffractive optical element which comprises a grating structure coupled at said waveguide substrate for partially diffracting the light as a diffracted light while propagating remaining portions of the light through total internal reflection within said waveguide substrate, wherein the diffracted light is projected out of said waveguide substrate towards the eyes of the user and the remaining portion continuously travels within said waveguide substrate by total internal reflection until an exit pupil expansion is fully completed, wherein at least one parameter related to a tooth configuration of said grating structure is modulated to change with respect to positions on said grating structure for obtaining varied diffraction efficiency of said output diffractive optical element at various positions, so as to allow said output diffractive optical element to provide an effective area arranged to maintain a constant output flux per unit area therein for providing an uniform brightness of the light when the light is being projected out of said waveguide substrate.

2. The augmented reality device, as recited in claim 1, wherein said exit pupil expansion has a sequential energy output generated by said output diffractive optical element, wherein an output diffraction efficiency of said output diffractive optical element is optimized to:

$$\eta_N = \frac{1}{N_T - (N-1)} \quad (1)$$

wherein N is the n-th modulation region, $N_T$ is the total number of modulation regions, and $\eta_N$ is an out-coupling efficiency of the n-th region.

3. The augmented reality device, as recited in claim 1, wherein said at least one parameter is selected from the group consisting of tooth height, duty cycle, tilt angle and face angle.

4. The augmented reality device, as recited in claim 1, wherein said grating structure of said output diffractive optical element is a one-dimensional straight tooth surface relief grating, wherein a parameter of duty cycle is modulated to provide varied duty cycles with respect to varied positions on said grating structure.

5. The augmented reality device, as recited in claim 1, wherein said grating structure of said output diffractive optical element is a one-dimensional straight tooth surface relief grating, wherein a parameter of tooth height is modulated to provide varied tooth heights with respect to varied positions on said grating structure.

6. The augmented reality device, as recited in claim 1, wherein said grating structure of said output diffractive optical element is a one-dimensional straight tooth surface relief grating, wherein parameters of duty cycle and tooth height are modulated to provide varied parameter values with respect to varied positions on said grating structure.

7. The augmented reality device, as recited in claim 1, wherein said grating structure of said output diffractive optical element is a one-dimensional slanted tooth surface relief grating, wherein a parameter of duty cycle is modulated to provide varied duty cycles with respect to varied positions on said grating structure.

8. The augmented reality device, as recited in claim 1, wherein said grating structure of said output diffractive optical element is a one-dimensional slanted tooth surface relief grating, wherein a parameter of tooth height is modulated to provide varied tooth heights with respect to varied positions on said grating structure.

9. The augmented reality device, as recited in claim 1, wherein said grating structure of said output diffractive optical element is a one-dimensional slanted tooth surface relief grating, wherein a parameter of tilt angle is modulated to provide varied tilt angles with respect to varied positions on said grating structure.

10. The augmented reality device, as recited in claim 1, wherein said grating structure of said output diffractive optical element is a one-dimensional slanted tooth surface relief grating, wherein two or more parameters of duty cycle, tooth height and title angle are modulated to provide varied parameters with respect to varied positions on said grating structure.

11. The augmented reality device, as recited in claim 1, wherein said grating structure of said output diffractive optical element is a one-dimensional blazed grating, wherein a parameter of tooth height is modulated to provide varied tooth heights with respect to varied positions on said grating structure.

12. The augmented reality device, as recited in claim 1, wherein said grating structure of said output diffractive optical element is a one-dimensional blazed grating, wherein a parameter of face angle is modulated to provide varied tilt angles with respect to varied positions on said grating structure.

13. The augmented reality device, as recited in claim 1, wherein said grating structure of said output diffractive optical element is a one-dimensional blazed grating, wherein parameters of tooth height and face angle are modulated to provide varied parameter values with respect to varied positions on said grating structure.

14. The augmented reality device, as recited in claim 1, wherein said grating structure of said output diffractive optical element is a two-dimensional diffraction structure to complete two-dimensional exit pupil expansion of the light, wherein a parameter of duty cycle is modulated to provide varied duty cycles with respect to varied positions on said grating structure.

15. The augmented reality device, as recited in claim 1, wherein said grating structure of said output diffractive optical element is a two-dimensional diffraction structure to complete two-dimensional exit pupil expansion of the light, wherein a parameter of tooth height is modulated to provide varied tooth heights with respect to varied positions on said grating structure.

16. The augmented reality device, as recited in claim 1, wherein said grating structure of said output diffractive optical element is a two-dimensional diffraction structure to complete two-dimensional exit pupil expansion of the light, wherein parameters of duty cycle and tooth height are modulated to provide varied parameter values with respect to varied positions on said grating structure.

17. The augmented reality device, as recited in claim 1, wherein each of said optical waveguides further comprises a transmission diffractive optical element that diffracts the light from said input diffractive optical element to said output diffractive optical element.

18. The augmented reality device, as recited in claim 1, wherein said optical projector is built-in with at least one of said spectacle arms of said spectacle frame, wherein said optical projector comprises a micro-display for projecting the light and a lens set that amplifies the light before entering said input diffractive optical element.

19. The augmented reality device, as recited in claim 1, wherein said augmented reality system further comprises an environment sensor built-in at said bridge of said spectacle frame between said optical waveguides, wherein said environment sensor comprises at least one of a RGB camera, a monochromatic camera, and a depth-sensing camera.

20. The augmented reality device, as recited in claim 1, wherein said augmented reality system further comprises a computing module and at least one inertial sensor built-in with at least one of said spectacle arms of said spectacle frame.

* * * * *